Patented Oct. 17, 1922.

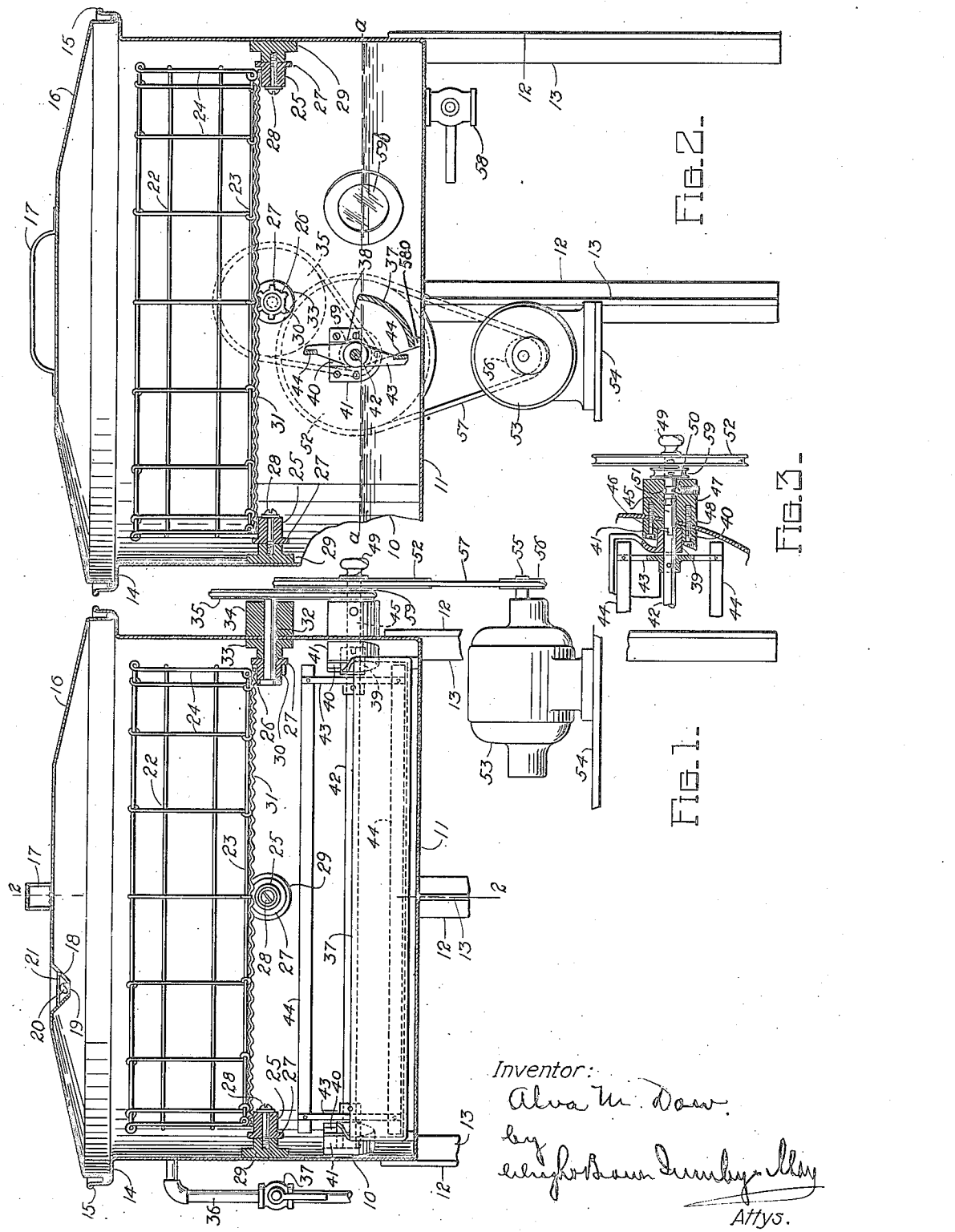

1,432,163

UNITED STATES PATENT OFFICE.

ALVA M. DOW, OF BRAINTREE, MASSACHUSETTS.

DISHWASHING MACHINE.

Application filed April 7, 1920. Serial No. 371,933.

*To all whom it may concern:*

Be it known that I, ALVA M. Dow, a citizen of the United States, residing at Braintree, in the county of Norfolk and State of Massachusetts, have invented new and useful Improvements in Dishwashing Machines, of which the following is a specification.

This invention has for its object to provide a simple portable machine for washing dishes. In attaining this object, I have devised, and shall herein describe, a machine which is especially applicable for use by housewives and domestic servants, which is power-operated, which is capable of being easily taken apart for cleaning and then reassembled, and which is efficacious in operation without injury to fine china and glassware.

In general, the machine comprises a rotary openwork basket for containing the dishes to be washed, a closed container therefor into which a quantity of hot water may be introduced below the basket, and a simple form of fan pump by which water may be dashed through the bottom of the basket against the dishes. The basket is rotated by power, such as furnished by a small electric motor, and the pump also is operated by the motor, so that, as the dishes move in a circular path, they are completely cleaned by the impingement of streams and sprays of hot water thereagainst. The basket and the fan pump are detachable, so that, when the dish washing is finished, they may be clean and dried.

On the accompanying drawing, which illustrates an embodiment of the present invention,—

Figure 1 represents a side elevation of the machine, the container or casing being shown in section.

Figure 2 represents a vertical section through the same on the line 2—2 of Figure 1.

Figure 3 is a sectional view showing the fan pump and the shaft by which it is operated.

Proceeding to a more detailed description of the machine, a cylindrical container or casing is shown at 10 having a closed bottom 11. This is supported by legs or standards 12 secured thereto by any suitable means. For purposes of stability, these legs have inwardly-extending webs or flanges 13, which, at their upper ends, abut against the bottom of the container. The upper end of the container flares outwardly as at 14 and is formed with an upwardly-extending flange 15, so as to receive a removable cover 16 which may be more or less dome-shaped as shown. A handle 17 affords means for removing and replacing the cover. Both the container and its cover may be formed of sheet metal, enameled or nickel-plated, as desired. The cover has a conical depression 18 with an aperture 19 at its apex, for the emission of steam, this being normally closed by a ball 20. The ball is retained in place by an apertured cross web 21. The web and the ball may be omitted, and, indeed, the depression 18 may be replaced by a simple aperture in the cover.

Within the container is the removable open-work dish holder or basket indicated as a whole at 22. It may be made of wire, as shown, so as to provide a bottom 23 and side walls 24, the wires of which it is made being spaced sufficiently closely together to prevent small dishes from falling through the bottom or sides of the basket, but also far enough apart to permit water to pass readily through the openings between the wires. This basket rests loosely upon three freely rotatable rolls 25, and a fourth roll 26, all four rolls being equi-distant from each other. Each roll has a guide flange 27, for the purpose of centering the basket or dish holder. Each roll 25 is journaled on a screw 28 threaded into a block or bracket 29 secured to the interior of the container in a horizontal plane approximately midway between the top and bottom of the container or casing. The roll 26 is axially grooved or corrugated or formed with teeth 30, to engage complemental corrugations or teeth on the basket. As shown at the outer edge of the bottom of the basket, a crimped or corrugated wire 31 furnishes the teeth to engage the teeth of the roll 26, so that, on rotating the roll, the basket will be slowly rotated about its own vertical axis. The roll 26 is secured upon a shaft 32 journaled in blocks or brackets 33, 34, secured to the interior and exterior faces of the side wall of the container or casing, and on its outer extremity is provided with a pulley 35 by which it may be rotated. From this description, it is clear that, on removing the cover from the casing or container, the basket may at any time be lifted and removed.

Water is delivered to the container in any suitable way. I have shown a pipe 36 for this purpose, which has a valve 37, and this pipe may be permanently connected with a hot-water tank, or may be coupled by a length of flexible hose with a hot-water faucet. Preferably, the pipe 36 enters the casing at a point above the horizontal plane of the bottom of the basket, so that the stream of water will be delivered against the dishes. Sufficient water is supplied to the container so that it will stand at about the level indicated by the horizontal dotted line $a$—$a$ in Figure 2. A pump or dasher is employed for delivering a stream of this water upwardly through the basket against the dishes. This instrumentality comprises an arcuate deflector 37 having segmental ends 38 which are provided with angular bosses 39. These bosses are placed in sockets 40 formed in blocks 41 secured to the inner face of the cylindrical wall of the container, so that the deflector is held in the position shown in Figure 2. Journaled in the bosses there is a shaft 42 having spiders 43 secured thereto, and on the spiders are secured the vanes or bars 44, which, when the shaft is rotated in the direction shown by the arrows, force or direct a stream of water upwardly past the deflector through the bottom of the basket. The shaft and the deflector are so located that the sheet or stream of water rises in a path approximately through the middle of the basket and diametrical of the bottom thereof. The deflector and the dasher, which constitute the pump, may be removed bodily by lifting them from the blocks 41. For the purpose of rotating the shaft 42, I employ an alined shaft 45, formed at its end with a rib 46 to engage a complemental recess in the shaft 42, so as to be clutched thereto as shown in Figure 3. This shaft 45 is journaled in a bracket 47 secured in place by screws 48 passed thereinto through the block 41 and through the wall of the container. The shaft 45 has a knob 49 by which it may be moved axially into and out of clutched engagement with shaft 42, and it may be held yieldingly in clutched or unclutched position by a spring-pressed ball 50 entering either of two grooves 51 formed on the shaft. The shaft 45 carries a large pulley 52 and a small pulley 59. The latter is connected by an endless belt with the pulley 35 on the basket-driving shaft 32. The pulley 52 may be provided with a crank handle for manual operation, but I prefer to drive it by a motor. I have shown a small electric motor 53 as secured upon a shelf 54 secured to the legs 12 below the container, and as having on its rotor shaft 55 a pulley 56 which drives pulley 52 by a belt 57.

The container may be evacuated by an outlet or drain valve 58 leading from the bottom thereof, and, of course, this valve may be connected by a hose with a trap or drain, if desired.

In operation, the basket, which is then removed from the casing or container, receives its complement of dishes and glassware, and is then placed on the rolls 25, 26, after which the cover is placed in position. A stream of boiling hot water is fed to the container until it reaches the desired level, usually to the plane indicated by the line $a$—$a$, or just below the axis of the shaft 42. A glazed aperture 590 in the side of the container serves as the water-level gage or indicator. The motor is now started, and, as the basket is slowly revolved, a sheet of water is forced upwardly by the fan pump, and, passing through the open-work basket, is caused to impinge against the surfaces of the dishes in the basket. It flows back into the lower part of the container, and is thus continuously circulated through the basket so as effectively to clean the dishes. The motor is stopped, and, if desired, the basket is removed and placed in a sink to permit the water to drain from the dishes and the latter to dry.

The deflector may rest also upon the bottom of the container as shown in Figure 2, in which event it is not necessary that the hubs 39 should be angular in cross section. As shown, the deflector is formed with lugs 580 for engagement with the bottom of the tank. This elevates the lower edge of the deflector above the said bottom, so that heavy sediment may pass under the deflector and not be thrown by the blades upwardly with the stream of water.

Having thus explained the nature of my said invention and described a way of making and using the same, although without attempting to set forth all of the forms in which it may be made or all of the modes of its use, what I claim is:

1. A dish-washing machine comprising a casing adapted to hold a pool of water, an open-work basket above the water level for holding the dishes, means for rotating the basket about a vertical axis, recessed brackets in said casing on opposite sides thereof, an arcuate deflector normally submerged in said pool and having hubs resting in the recesses of the brackets, and a shaft journaled in said hubs and having blades for cooperating with said deflector to force a stream of water upwardly from said pool.

2. A dish-washing machine comprising a casing adapted to hold a pool of water, an open-work basket above the water level for holding the dishes, means for rotating the basket about a vertical axis, recessed brackets in said casing on opposite sides thereof, an arcuate deflector normally submerged in said pool and having hubs resting in the recesses of the brackets, a shaft journaled in said hubs and having blades for cooperating with said deflector to force a stream of water upwardly from said pool, and a drive shaft having coupling means for engagement with said first-mentioned shaft, said deflector and the shaft journaled therein being bodily removable from said container.

In testimony whereof I have affixed my signature.

ALVA M. DOW.